United States Patent
Campagnolo

[19]

[11] Patent Number: 5,865,454
[45] Date of Patent: Feb. 2, 1999

[54] ELECTRONICALLY CONTROLLED SPEED CHANGE DEVICE FOR BICYCLES

[75] Inventor: Valentino Campagnolo, Vicenza, Italy

[73] Assignee: Campagnolo S.r.l., Vicenza, Italy

[21] Appl. No.: 601,149

[22] Filed: Feb. 13, 1996

[30] Foreign Application Priority Data

Jun. 7, 1995 [IT] Italy .................................. TO95A0474

[51] Int. Cl.[6] .................................................. F16H 61/00
[52] U.S. Cl. ........................... 280/238; 280/261; 474/70; 474/78; 474/110
[58] Field of Search ..................................... 280/236, 237, 280/238, 259, 260, 261; 474/71, 78, 81, 110, 80

[56] References Cited

U.S. PATENT DOCUMENTS

| | | | |
|---|---|---|---|
| 3,919,891 | 11/1975 | Stuhlmuller | 280/238 |
| 4,490,127 | 12/1984 | Matsumoto | 280/236 |
| 4,605,240 | 8/1986 | Clem et al. | 280/236 |
| 4,946,425 | 8/1990 | Buhlmann | 474/80 |
| 5,213,548 | 5/1993 | Colbert | 280/238 |
| 5,356,348 | 10/1994 | Bellio | 280/238 |
| 5,480,356 | 1/1996 | Campagnolo | 474/80 |
| 5,551,315 | 9/1996 | Piloulas | 74/502.2 |
| 5,571,056 | 11/1996 | Gilbert | 474/80 |

FOREIGN PATENT DOCUMENTS

| | | |
|---|---|---|
| 0529664 | 1/1993 | European Pat. Off. . |
| 0566024 | 1/1993 | European Pat. Off. . |
| 0647558 | 2/1995 | European Pat. Off. . |
| WO9117078 | 11/1991 | WIPO . |

*Primary Examiner*—Anne Marie Boehler
*Attorney, Agent, or Firm*—Sughrue, Mion, Zinn, Macpeak & Seas, PLLC

[57] ABSTRACT

An electronically controlled speed change device for bicycles has an automatic mode of operation in which, at the request of the cyclist for increase or decrease of the speed ratio, the system itself automatically provides to select the pair front crown wheel-rear sprocket which is most suitable to provide a progressive increase, or respectively a decrease, of the distance covered by the bicycle at each turn of the pedals.

6 Claims, 3 Drawing Sheets

ELECTRONICALLY CONTROLLED SPEED CHANGE DEVICE FOR BICYCLES

BACKGROUND OF THE INVENTION

The present invention relates to a speed change device for bicycles, of the type comprising:

a front derailleur and a rear derailleur for controlling selective engagement of a bicycle chain respectively with a plurality of toothed crown wheels associated to the bicycle crank axle and a plurality of sprockets associated to the hub of the bicycle rear wheel, a first and a second electric motor respectively associated to the front derailleur and the rear derailleur, for control thereof, means for detecting the operative position of the front derailleur and the rear derailleur, manually controlled activating means for activating the first and second electric motor, and an electronic control unit for controlling the speed change device, which is connected to said first and second electric motor, said detecting means and said activating means.

A device of the above indicated type has formed the subject of Italian patent application No. T093A000503 filed by the same applicant on Jul. 8, 1993 and laid open to public inspection on Jan. 8, 1995, as well as of corresponding French patent application Ser. No. 2,708,559, and corresponding German patent application No. 44 22 845. An improvement of this device has also formed the subject of Italian patent application No. T094A000116 of Feb. 24, 1994, filed by the same applicant and still secret at the priority date of this application.

SUMMARY OF THE INVENTION

The object of the present invention is that of further improving the devices forming the subject of the above mentioned patent applications so as to enable an extremely easy and rapid use by the cyclist. This need is felt particularly (even if not exclusively) in the case of race bicycles, since the racer must keep his attention as much as possible to the race even when he carries out a speed change, particularly without loosing precious seconds in order to decide the combination front crown wheel-rear sprocket which must be selected.

In order to achieve this object, the invention provides a speed change device for bicycles of the type indicated at the beginning, characterized in that said activating means comprise a first and a second manually controlled actuating member, respectively for causing an increase or a decrease of speed at each actuation, and in that said electronic control unit is programmed so as to automatically select, each time one of the two actuating members is activated, the front crown wheel and the rear sprocket on which the chain must be engaged in order to ensure a progressive increase or decrease of the distance covered by the bicycle at each pedal turn, said electronic control unit providing as a consequence for actuation of one or both of said electric motors to achieve the required condition of engagement of the chain on the selected front crown wheel and the selected rear sprocket, starting from the condition indicated by said detecting means, and providing finally to stop the electric motor which has been activated, or both the electric motors, if they have been both activated, when said detecting means detect that said required condition has been reached.

As it is clearly apparent, the concept which is at the basis of the present invention is therefore a particular strategy which is followed by the electronic control unit to select the pair front crown wheel-rear sprocket at each speed change. Supposing for example that the cyclist wishes to increase the speed, he will actuate one or more times the actuating member which controls the passage towards higher speeds. Each actuation of the actuating member will cause a speed change. At each speed change, the electronic control unit will select a pair front crown wheel-rear sprocket such that with the passage from one speed to the following ones a progressive increase of the distance covered by the bicycle at each pedal turn will take place. Inversely, in the case the cyclist actuates one or more times the actuating member which controls the decrease of speed, pairs front crown wheel-rear sprocket are selected each time in such a manner as to ensure a progressive decrease of the distance covered at each pedal turn.

Naturally, the system may be provided with selecting means for enabling the user to control the operation either according to the semi-automatic mode which has been described above, or according to a completely manual mode, in which the user controls separately the front derailleur and the rear derailleur according to his desire.

The concept which is at the basis of the present invention lies therefore in the choice of a progressive or regressive criterion relating to the distance covered at each pedal turn when selecting the pair front crown wheel-rear sprocket at each speed change.

BRIEF DESCRIPTION OF THE DRAWINGS

Further features and advantages of the present invention will become apparent from the following description with reference to the annexed drawings, given purely by way of non limiting example, in which.

DETAILED DESCRIPTION OF THE INVENTION

Figure 1:
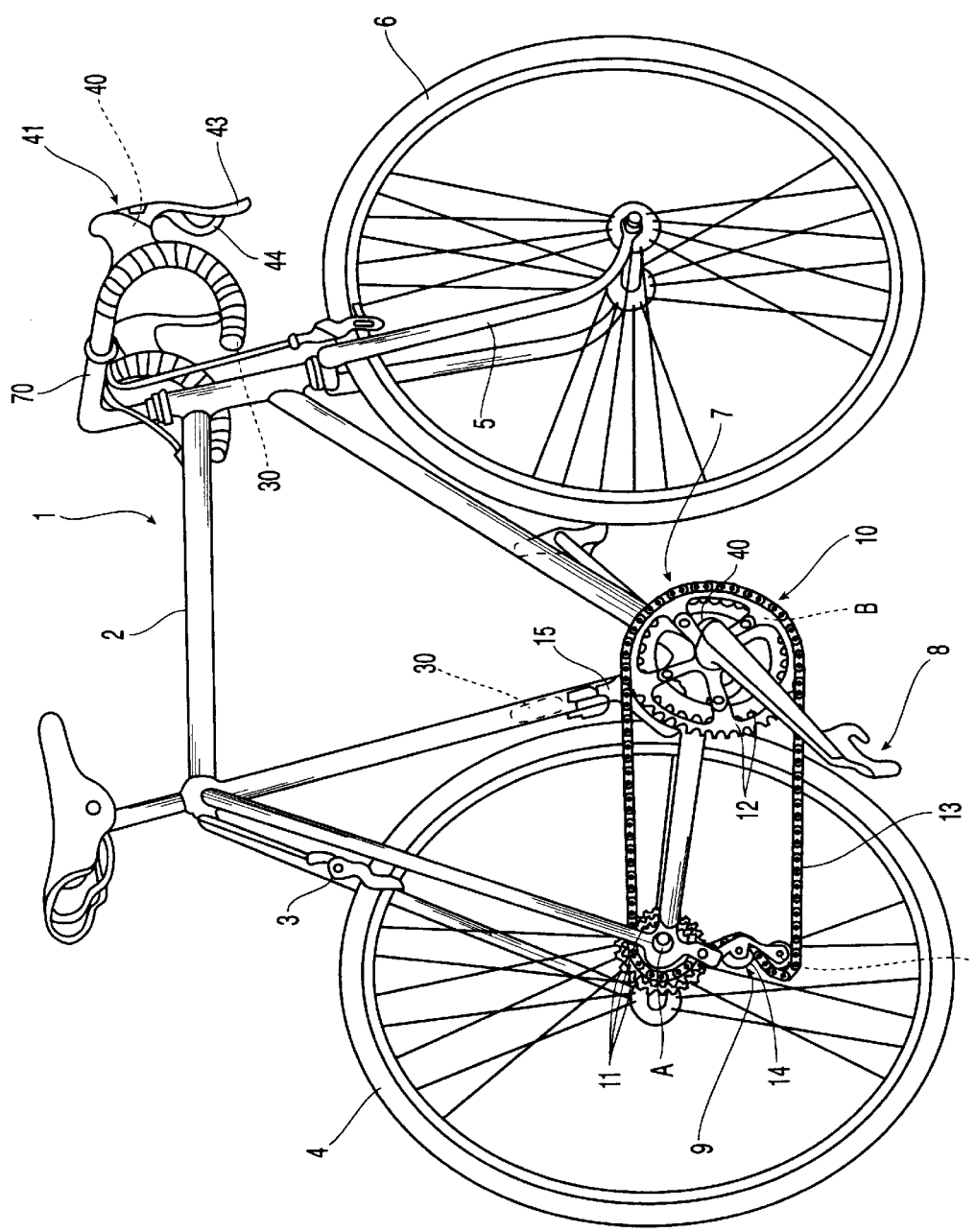
FIG. 1 diagrammatically shows a perspective view of a bicycle provided with a device according to the present invention.

With reference to FIG. 1, a race bicycle includes a frame 2 formed in a known manner by tubular elements defining a support structure 3 for a rear wheel 4 and a fork 5 for a front wheel 6. A handlebar 70 having a tubular structure is operatively connected to the fork 5.

The frame 2 at its lower portion supports a crank axle or pedal unit 7, of conventional type, for actuating the rear wheel 4 through a speed change device according to the invention, generally designated device 8.

The speed change device 8 is substantially formed by a rear speed change 9 and a front speed change 10. The rear speed change 9 includes a plurality of chain sprockets 11 (eight in number in the illustrated example) having different diameters and coaxial with axis A of the rear wheel 4. The front speed change 10 includes a plurality of toothed chain crowns 12 (two in number in the illustrated example) having different diameters and coaxial with axis B of the bicycle crank axle 7.

The chain sprockets 11 which are chain crown wheels 12 are selectively engageable by an endless transmission chain 13, to provide the different speed ratios which are available by means of the speed change unit 8. The different ratios can be obtained by moving a rear derailleur 14 of the rear speed change 9 and a front derailleur 15 of the front speed change 10.

According to the solution proposed in the previous patent applications of the same applicant which have been identified above, both the front derailleur 15 and the rear derailleur 14 are provided with a respective electric motor and reducing unit (which is shown only diagrammatically in FIG. 2 by reference numerals 14a and 15a) which is used to drive movement of the derailleur to cause the chain to be derailled on the various sprockets or, respectively, on the various crown wheels.

The details of construction of said electric motor and reducing units and their mounting on the derailleurs are not illustrated herein since they are shown in said previous patent applications of the applicant. The same applies to an encoder device (designated by 14b and 15b in FIG. 2) which is associated to each electric motor and reducing unit and acts as a detector of the position of the motor reducing unit and hence of the derailleur associated therewith.

Figure 2:
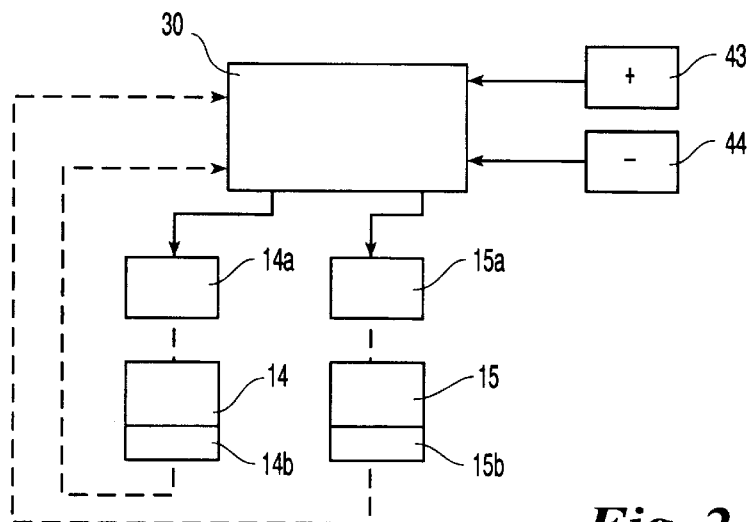
FIG. 2 is a block diagram of the device according to the invention.

Again according to what has been shown in the previous patent applications of the same applicant, the electric supply to the motor and reducing units 14a, 15a is provided by a battery 30 (FIG. 1) advantageously housed in one of the tubes of frame 2 or, alternatively, within one of the arms of the handlebar 70, or within the housing of a microprocessor control unit 40 (FIG. 1) which is fixed for example to the frame of the bicycle in the area of the crank axle and provides to controlling the system in the way which will be shown in detail in the following. The two front and rear derailleurs 14, 15 are controlled by said electronic control unit 30 on the basis of signals imparted by two manually controlled actuating levers 43, 44 associated to a brake lever 41 (FIG. 1). The microprocessor unit 40 (which can be also housed in the brake lever unit) is also connected, as shown in FIG. 2, to the two encoders 14b, 15b which detect the position of the respective derailleurs 14, 15, in order to stop the respective actuating electric motor when the desired transmission ratio is reached, which is set by manually actuating levers 43, 44, which respectively serve for moving towards higher and lower speeds.

The connections to said components are made by wires (not shown in FIG. 1) advantageously housed inside the tubes of frame 2.

Again according to a further feature known from the previous patent applications of the applicant, the battery 30 may be of a rechargeable type, and the rear derailleur may incorporate a dynamo-electric unit, of a type known per se, mounted within one of the wheels 14c of the conventional guiding member associated to the rear derailleur, in order to provide for recharging of the battery.

In the preferred embodiment of the invention which is described herein, the electronic control unit 30 is programmed so as to enable two different modes of operation, which can be selected by the cyclist by actuating a selection lever or button. According to a first manual mode of operation, the cyclist separately controls the front derailleur 15 and the rear derailleur 14. For each of the two derailleurs therefore he actuates a separate control device which causes the passage towards higher or lower speed ratios. The detail of this control device are not illustrated herein, since they can be made in any known way and since they do not fall, taken alone, within the scope of the present invention.

According to the most important aspect of the invention, the electronic control unit 30 also enables a semi-automatic mode of operation. In this case the cyclist must again actuate two separate control devices, for example the levers 43, 44. However, each of these control devices simultaneously control the front derailleur and the rear derailleur 14, 15 and serve for causing the passage towards higher or lower speeds, respectively. It is indeed the system which decides, without any intervention by the cyclist, which is at each time the pair front crown wheel-rear sprocket to be selected. According to the invention, the criterion adopted to select the pair crown-sprocket is that to ensure that at the passage towards higher speeds or towards lower speeds a progressive increase, or decrease, takes place of the distance covered by the bicycle at each pedal turn. In other words, when the cyclist wishes to change speed, he must only actuate one or more times one of the two actuating levers 43, 44 (depending from that he wishes to go towards higher or lower speeds) without caring to decide at each time which is the combination crown-sprocket which is most suitable to his needs. At each actuation of one of the buttons 43, 44, it is the system itself which automatically controls the rear derailleur and if necessary also the front derailleur to select the pair front crown-rear sprocket which is most suitable.

Figure 4:
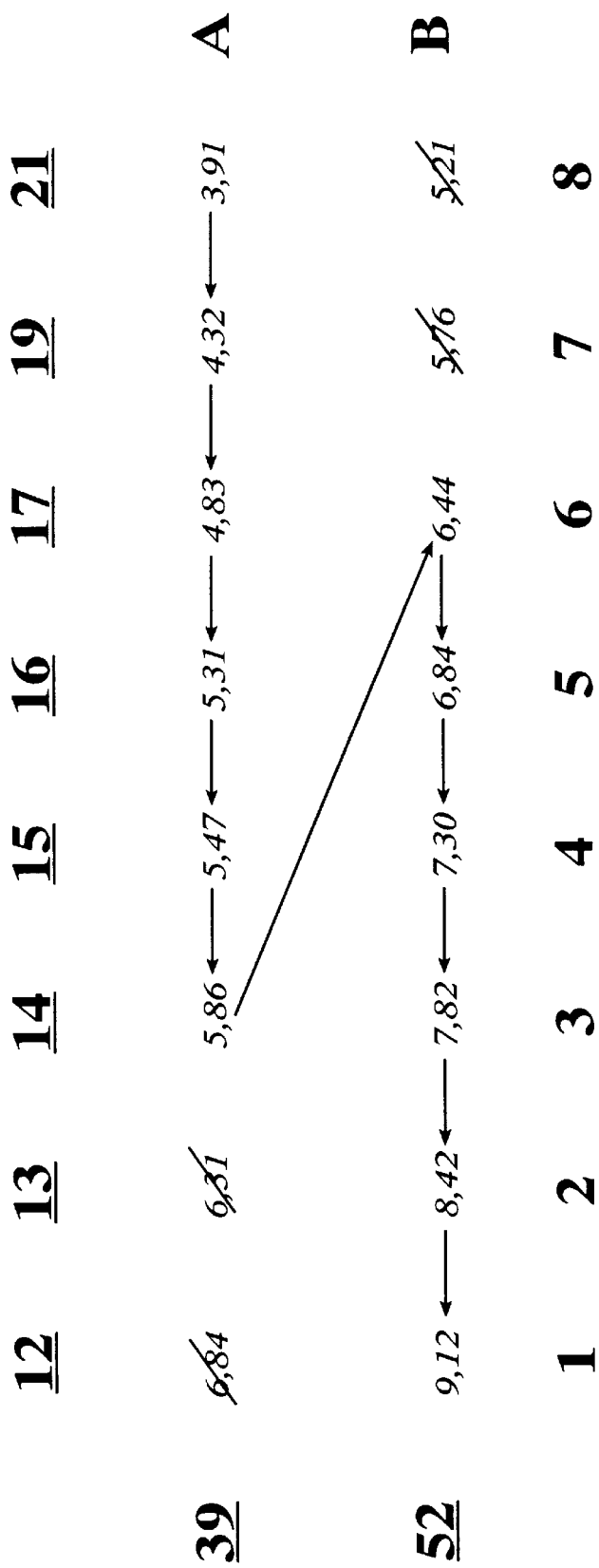
FIG. 4 shows a table corresponding to a possible criterion of operation of the device according to the invention.

This principle of operation can be better understood with reference to FIG. 4, which shows a table relating to a possible example of use of the invention. This table relates to the case in which there are provided eight sprockets (numbered in the lower line of the table from 1 through 8) having respectively 12, 13, 14, 15, 16, 17, 19 and 21 teeth, and in which two toothed crown wheels are provided, designated by A and B in the column at the right of the table, respectively having 39 and 52 teeth. The table shows, for each combination sprocket-crown, the distance in meters covered by the bicycle at each pedal turn. The electronic control unit 30 is programmed to automatically provide, at each actuation by the cyclist, the most suitable selection of crown-sprocket. In the illustrated case, the combination corresponding to the lower speed is that of crown A with sprocket 8 (distance covered at each pedal turn: 3.91 m). Supposing to be in this condition, if the cyclist actuates one or more times lever 43 to cause one or more passages towards higher speeds, the system provides automatically to switch to the further illustrated combinations, according to the route shown by arrows in FIG. 4. Therefore, one passes in sequence to the combinations A-7, A-6, A-5, A-4, A-3, B-6 (at this passage, the system causes therefore also the movement of the front derailleur), B-5, B-4, B-3, B-2 and B-1. As shown, at said passages, the distance covered at each pedal turn passes in sequence to 4.32 m, 4.83 m, 5.13 m, 5.47 m, 5.86 m, 6.44 m, 6.84 m, 7.30 m, 7.82 m, 8.42 m, 9.12 m. As it is clearly apparent therefore at each actuation of an increase in speed imparted by the cyclist, a progressive increase of the distance covered at each pedal turn takes place. Naturally, if the cyclist actuates one or more times lever 44 for causing a decreasing speed, the process is exactly the opposite. As shown, finally, in the table the values of distances corresponding to combinations A-1, A-2, B-7, B-8 have been deleted, since they are never selected by the system.

Naturally, sprockets and crowns with a number of teeth different from those shown by way of example in FIG. 4 can be used. For example, in one case tested in practice by the applicant, five different tables have been provided corresponding to five different sprocket and crown groups. The electronic control unit 30 is programmed to operate according to any of these tables, and the cyclist has the possibility to teach to the system which table must be applied, as a function of the sprockets and crowns which are mounted on the bicycle.

As indicated already, if however the cyclist selects the manual mode of operation, he may directly and separately actuate the front derailleur and the rear derailleur, thus obtaining any desired combination. According to a feature forming a subject of the previous patent applications of the applicant which have been identified above, in this case, the system may operate to control a small correcting movement of the front derailleur when only the rear derailleur is actuated in such a manner that the chain is moved to a position much inclined with respect to the vertical longitudinal plane of the bicycle.

Figure 3:
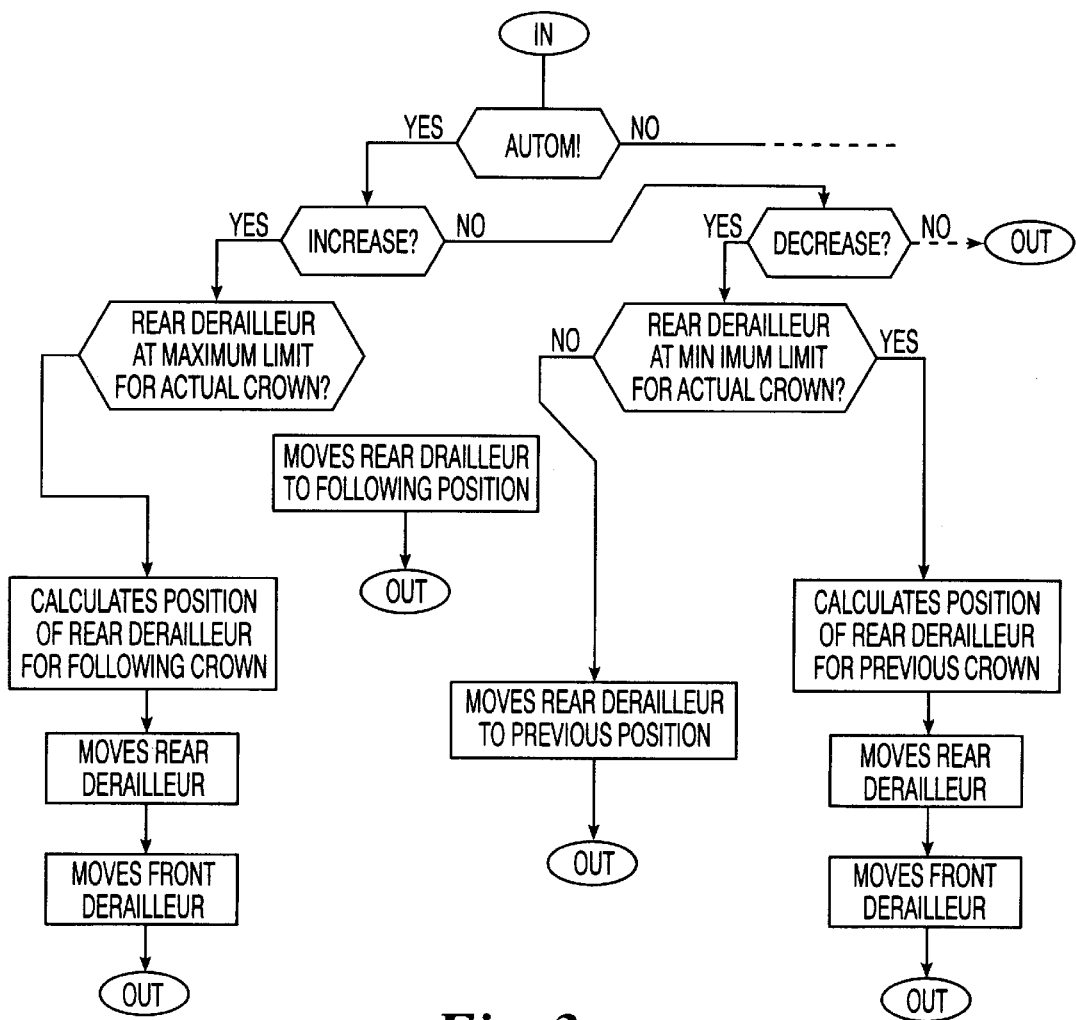
FIG. 3 shows a flow diagram which relates to a mode of operation of the device according to the invention.

FIG. 3 shows a flow diagram corresponding to the logic operations which are carried out by the electronic control unit 30 following an actuation by the cyclist. As shown in this figure, the system first asks whether the automatic mode of operation is requested or not. If the automatic operation is not requested, the system operates in the conventional mode which has been mentioned above. If however the automatic operation is enabled, the system asks whether an increase of speed is requested or not. If an increase of speed is requested, the system asks whether the position of the change or rear derailleur 14 is at the maximum limit for the crown which is actually engaged by the chain. For example, in the case of the table of FIG. 4, the system asks whether, with crown A engaged, the engaged sprocket is sprocket 3. If the system is in this condition, it calculates the position of the rear derailleur for the following crown (in the illustrated example, the following crown is crown B and hence the following sprocket is sprocket 6). At this time, the system drives the rear derailleur to cause the chain to derail from sprocket 3 to sprocket 6. Then the system drives the front derailleur to cause the chain to derail from crown A to crown B.

If however the system is not at the maximum limit which has been indicated above (pair A-3), the system simply drives the rear derailleur to move the chain to the following sprocket (always according to the route shown by the arrows in FIG. 4). Returning at the beginning of the flow diagram, if there is no request of increase of speed, the system asks whether there is a request of decrease of speed. In the affirmative case, the system asks whether the rear derailleur is at the minimum limit for the crown which is actually engaged by the chain (in other words the system asks for example if, with crown B engaged, the engaged sprocket is sprocket 6). In the negative case, the system simply drives the rear derailleur so as to position the chain on the following sprocket, again according to the route shown in the table of FIG. 4. However, in the affirmative case, the system calculates the position of the rear derailleur for the previous crown and then subsequently positions the rear derailleur and then the front derailleur to provide the suitable pair (in the case of FIG. 4 the passage from pair B-6 to pair A-3 would be made).

As indicated already, the electronic control system is able to be adjusted in the case of replacement of the rear wheel, by setting the zero position for the position detecting device at choice at any of the two sprockets arranged at the ends of the sprocket unit. Indeed, if this procedure were possible only for one of the two end sprockets, in some situations it would be necessary to move the chain through all the sprockets to reach the position in which it is possible to set the zero position, so that at the end of this operation a speed ratio would be provided greatly different from the previous one, which could cause disturbance to the cyclist.

The system is preferably able to be connected to an outside device for diagnostic and/or a device for recharging the electric supply battery.

According to a further feature, the electronic control system is able to carry out diagnostics on the state of the supply battery, and display same.

Finally, according to a further possible feature of the invention, the system comprises a digit display for indicating, inter alia, the positions of the front derailleur and the rear derailleur; moreover, further parameters relating to the operation and performance of the bicycle can be displayed.

Naturally, while the principle of the invention remains the same, the details of construction and the embodiments may widely vary with respect to what has been described and illustrated purely by way of non limiting example, without departing from the scope of the present invention.

What is claimed is:
1. Speed change device for bicycles, comprising:
   a front derailleur and a rear derailleur for controlling selective engagement of a bicycle chain respectively on a plurality of crown wheels associated to the bicycle crank axle and on a plurality of sprockets associated to the hub of the bicycle rear wheel,
   a first and a second electric motor respectively associated to the front derailleur and the rear derailleur, for control thereof,
   means for detecting the operative position of the front derailleur and the rear derailleur,
   manually controlled activating means, for activating the first and second electric motor, and
   an electronic control unit for the speed change device, which is connected to said first and second electric motor, to said detecting means and said activating means,
   wherein said activating means comprise a first and a second manually controlled activating member, respectively for controlling an increase or a decrease of the speed ration at each actuation, and
   wherein said electronic control unit is programmed with a plurality of tables of sprocket and crown combinations, each table relating to different sprocket and crown groupings which may be installed on the bicycle, and is provided with means for choosing a specific table, said electronic control unit being further programmed so as to automatically select on the basis of the specific table chosen, each time one of the two actuating members is activated, the front crown wheel and the rear sprocket on which the chain must be engaged in order to ensure a progressive increase or decrease of the distance covered by the bicycle at each pedal turn, said electronic control unit providing as a consequence for controlling one or both of said electric motors to obtain the desired engagement condition of the chain on the selected front crown wheel and selected rear sprocket, starting from the condition indicated by said detecting means, and finally providing to stop the electric motor which has been activated, or both the electric motors, if they have been both activated, when said detecting means detect that said desired condition has been reached.

2. Speed change device according to claim 1, wherein said electronic control unit is connected to means for selecting the mode of operation to select among an automatic mode of operation having the above indicated features, and a manual mode of operation, in which it is possible to drive separately and manually the front derailleur and the rear derailleur.

3. Speed change device according to claim 1, wherein the electronic control unit is programmed to set the zero position for the position detecting device, following a replacement of the bicycle rear wheel, by making reference to any of the two end sprockets of the sprocket unit.

4. Speed change device according to claim 1, wherein said electronic control unit is provided with means for connection thereof to an outside device provided on the bicycle.

5. Speed change device according to claim 1, wherein the electronic control unit is programmed to carry out diagnostics on the state of charge of an electric supply battery provided on the bicycle and to provide the corresponding information.

6. Speed change device according to claim 1, wherein it comprises a digit display connected to said electronic control unit to display the positions of the front derailleur and the rear derailleur.

\* \* \* \* \*